US008729198B2

(12) United States Patent
Keledjian et al.

(10) Patent No.: US 8,729,198 B2
(45) Date of Patent: *May 20, 2014

(54) COMPOSITIONS COMPRISING THIOL-TERMINATED POLYMERS AND SULFUR-CONTAINING ETHYLENICALLY UNSATURATED SILANES AND RELATED CURED SEALANTS

(75) Inventors: Raquel Keledjian, Glendale, CA (US); Renhe Lin, Stevenson Ranch, CA (US); Chandra Rao, Valencia, CA (US); Bruce Virnelson, Valencia, CA (US)

(73) Assignee: PRC DeSoto International, Inc., Sylmar, CA (US)

( * ) Notice: Subject to any disclaimer, the term of this patent is extended or adjusted under 35 U.S.C. 154(b) by 819 days.

This patent is subject to a terminal disclaimer.

(21) Appl. No.: 12/855,725

(22) Filed: Aug. 13, 2010

(65) Prior Publication Data
US 2012/0040103 A1 Feb. 16, 2012

(51) Int. Cl.
*C08F 283/00* (2006.01)
*C08G 75/02* (2006.01)
*C08L 81/02* (2006.01)

(52) U.S. Cl.
CPC ..................................... *C08L 81/02* (2013.01)
USPC .......................................................... 525/535

(58) Field of Classification Search
USPC .......................................................... 525/535
See application file for complete search history.

(56) References Cited

U.S. PATENT DOCUMENTS

| 3,640,923 | A | | 2/1972 | Guthrie |
| 4,366,307 | A | | 12/1982 | Singh et al. |
| 4,886,862 | A | * | 12/1989 | Kuwamura et al. ........... 526/247 |
| 5,352,530 | A | * | 10/1994 | Tanuma et al. ................ 428/442 |
| 5,432,226 | A | * | 7/1995 | Aonuma et al. ............... 524/506 |
| 5,912,319 | A | | 6/1999 | Zook et al. |
| 5,959,071 | A | | 9/1999 | DeMoss et al. |
| 6,015,475 | A | | 1/2000 | Hsieh et al. |
| 6,172,179 | B1 | | 1/2001 | Zook et al. |
| 6,232,401 | B1 | | 5/2001 | Zook et al. |
| 6,479,622 | B1 | * | 11/2002 | Gross et al. .................... 528/376 |
| 6,551,710 | B1 | | 4/2003 | Chen et al. |
| 8,426,112 | B2 | * | 4/2013 | Nakajima et al. ........... 430/272.1 |
| 2002/0007015 | A1 | * | 1/2002 | DeMoss et al. ................ 525/212 |
| 2002/0013450 | A1 | | 1/2002 | Zook et al. |
| 2006/0270796 | A1 | | 11/2006 | Sawant et al. |
| 2007/0142605 | A1 | * | 6/2007 | Bojkova et al. ................. 528/44 |
| 2009/0047531 | A1 | | 2/2009 | Bartley et al. |
| 2009/0286002 | A1 | | 11/2009 | Iezzi et al. |
| 2009/0286015 | A1 | | 11/2009 | Matsukawa et al. |
| 2010/0130687 | A1 | * | 5/2010 | Tu et al. ........................ 525/104 |
| 2012/0040104 | A1 | * | 2/2012 | Keledjian et al. ............. 427/515 |

FOREIGN PATENT DOCUMENTS

| JP | 2001-089568 | 4/2001 |
| JP | 2004-326042 | 11/2004 |
| WO | WO 2009137197 A2 * | 11/2009 |

OTHER PUBLICATIONS

Mark Caddy, Terence J. Kemp, "Photoactive Liquid polysulfides: preparation, characterisation, photocuring and potential applications", Elsevier, European Polymer Journal 39 (2003), pp. 461-487, Department of Chemistry, University of Warwick, Coventry CV4 7AL, UK.
U.S. Appl. No. 12/855,729, filed Aug. 13, 2010, entitled: "Methods for Making Cured Sealants by Actinic Radiation and Related Compositions".

* cited by examiner

*Primary Examiner* — Mike M Dollinger
(74) *Attorney, Agent, or Firm* — William Lambert

(57) ABSTRACT

Disclosed are compositions that include: a) a thiol-terminated polymer; and b) a sulfur-containing ethylenically unsaturated silane. Related products, such as sealants, that include polymers derived from such compositions, are also disclosed.

34 Claims, No Drawings

US 8,729,198 B2

COMPOSITIONS COMPRISING THIOL-TERMINATED POLYMERS AND SULFUR-CONTAINING ETHYLENICALLY UNSATURATED SILANES AND RELATED CURED SEALANTS

CROSS-REFERENCE TO RELATED APPLICATION

This application is related to U.S. patent application Ser. No. 12/855,729, entitled, "Methods For Making Cured Sealants By Actinic Radiation And Related Compositions", filed concurrently herewith.

FIELD OF THE INVENTION

The present invention is directed to compositions that comprise: (a) a thiol-terminated polymer; (b) a sulfur-containing ethylenically unsaturated silane; and, in some cases, one or more additional optional components, such as a photoinitator. The present invention also relates to cured products, such as aerospace sealants, that comprise the reaction product of reactants comprising: (a) a thiol-terminated polymer; and (b) a sulfur-containing ethylenically unsaturated silane.

BACKGROUND OF THE INVENTION

Thiol-terminated sulfur-containing compounds are known to be well-suited for use in various applications, such as aerospace sealant compositions, due, in large part, to their fuel-resistant nature upon cross-linking. Other desirable properties for aerospace sealant compositions include low temperature flexibility, short curing time (the time required to reach a predetermined strength) and elevated-temperature resistance, among others. Sealant compositions exhibiting at least some of these characteristics and containing thiol-terminated sulfur-containing compounds are described in, for example, U.S. Pat. Nos. 2,466,963, 4,366,307, 4,609,762, 5,225,472, 5,912,319, 5,959,071, 6,172,179, 6,232,401, 6,372,849 and 6,509,418.

Another important characteristic for aerospace sealant compositions is strong adhesion to typical aircraft substrates, such as substrates used in fuel tanks. Examplary materials for such substrates include metals, such as aluminum and aluminum alloys. As a result, aerospace sealant compositions often include adhesion promoting ingredients, such as epoxy, thiol, or amino functional silanes, which are known to bond an organic composition, such as a sealant composition, to an inorganic substrate, such as certain metals, via a hydrolyzable group that forms a metal-siloxane bond (Si—O-metal).

Thus, sealant compositions that are storage stable but, when applied to a substrate, can be cured quickly to form a cured sealant having the characteristics described above are desired. Compositions that cure when exposed to actinic radiation, such as ultraviolet radiation, as can be the case with the reaction of thiol functional compounds with ethylenically unsaturated compounds (sometimes referred to as "enes"), are a candidate for such sealant compositions. Such compositions may include a photoinitator that generates free radicals upon exposure to ultraviolet radiation. These free radicals lead to crosslinking via a thiol-ene reaction, which can often be completed within seconds.

It is believed that one drawback to the use of such compositions is that the rate of the crosslinking reaction can be so fast that conventional adhesion promoting agents, such as the epoxy, thiol, or amino functional silanes mentioned earlier, do not have sufficient time to react with the substrate prior to cure of the sealant, thereby reducing their effectiveness. As a result, it is desirable to provide sealants exhibiting good adhesion to aircraft substrates, such as fuel tank substrates, even when formed as a result of a very rapid radiation curing mechanism.

SUMMARY OF THE INVENTION

In certain respects, the present invention is directed to compositions, such as one pack compositions, comprising: a) a thiol-terminated polymer; and b) a sulfur-containing ethylenically unsaturated silane.

In other respects, the present invention is directed to products, such as sealants, that comprise polymers comprising the reaction product of reactants comprising: a) a thiol-terminated polymer; and b) a sulfur-containing ethylenically unsaturated silane.

The present invention is also directed to, inter alia, methods for making such polymers and sealants.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As indicated, certain embodiments of the present invention are directed to compositions comprising: a) a thiol-terminated polymer; and b) a sulfur-containing ethylenically unsaturated silane. As used herein, "polymer" refers to oligomers and both homopolymers and copolymers. As used herein, "thiol" refers to a mercaptan group, that is, an "SH" group. A "thiol-terminated polymer" refers to a polymer comprising one or more terminal thiol groups that are reactive with other functional groups.

In certain embodiments, the compositions are substantially, or, in some case, completely free of any component comprising ester linkages. As used herein, the term "substantially free" means that the composition includes ester linkages, if at all, as an incidental impurity. Any incidental ester linkages are present in an incidental amount such that they do not affect the properties of the compositions or sealants of the present invention. As used herein, "ester linkage" refers to a

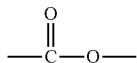

linkage.

In certain embodiments, the thiol-terminated polymer comprises sulfur-containing linkages in the polymeric backbone, such as is the case with, for example, polysulfide polymers and polythioether polymers. As used herein, the term "polysulfide" refers to any compound that comprises a sulfur-sulfur linkage (—S—S—). As used herein, the term "polythioether" refers to compounds comprising at least two thioether linkages, that is "—C—S—C—" linkages. Thiol-terminated polymers that comprise sulfur in the polymeric backbone and methods for their production, and which are suitable for use in the compositions of the present invention include, for example, those disclosed in U.S. Pat. No. 4,366,307 at col. 3, line 7 to col. 9, line 51 and U.S. Pat. No. 6,172,179 at col. 5, line 42 to col. 12, line 7, the cited portions of which being incorporated by reference herein. In certain embodiments, therefore, the thiol-terminated polymer comprises a polythioether that includes a structure having the formula (I):

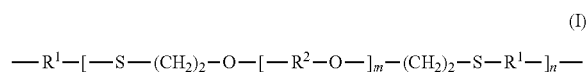
(I)

wherein: (1) each $R^1$ independently denotes a $C_{2-6}$ n-alkylene, $C_{2-6}$ branched alkylene, $C_{6-8}$ cycloalkylene or $C_{6-10}$ alkylcycloalkylene group,

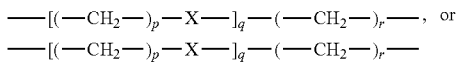

in which at least one —CH$_2$— unit is substituted with a methyl group, wherein (i) each X is independently selected from O, S and —NR$^6$—, wherein R$^6$ denotes H or methyl; (ii) p is an integer having a value ranging from 2 to 6; (iii) q is an integer having a value ranging from 0 to 5; and (iv) r is an integer having a value ranging from 2 to 10; (2) each $R^2$ independently denotes a $C_{2-6}$ n-alkylene, $C_{2-6}$ branched alkylene, $C_{6-8}$ cycloalkylene or $C_{6-10}$ alkylcycloalkylene group, or

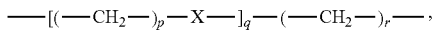

wherein (i) each X is independently selected from O, S and —NR$^6$—, wherein R$^6$ denotes H or methyl; (ii) p is an integer having a value ranging from 2 to 6; (iii) q is an integer having a value ranging from 0 to 5; and (iv) r is an integer having a value ranging from 2 to 10; (3) m is a rational number from 0 to 10; and (4) n is an integer having a value ranging from 1 to 60. Such polythioethers and methods for their production are described in U.S. Pat. No. 6,172,179 within the portion thereof incorporated herein by reference above.

More particularly, in certain embodiments, the thiol-terminated polymer has a structure according to formula (II):

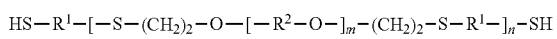
(II)

in which $R^1$, $R^2$, m and n are as described above with respect to formula (I).

In certain embodiments, the thiol-terminated polymer is polyfunctionalized. As a result, in certain embodiments, the thiol-terminated polymer has a structure according to formula (III):

B-(A-[R$^3$]$_y$—SH)$_z$        (III)

wherein: (1) A denotes a structure according to formula (I); (2) y is 0 or 1; (3) $R^3$ denotes a single bond when y=0 and

when y=1; (4) z is an integer from 3 to 6; and (5) B denotes a z-valent residue of a polyfunctionalizing agent.

Suitable methods for making such polyfunctionalized polythioether polymers are disclosed in, for example, U.S. Pat. No. 6,172,179 at col. 7, line 48 to col. 12, line 7, the cited portion of which being incorporated herein by reference above.

As indicated earlier, the compositions of the present invention comprise a sulfur-containing ethylenically unsaturated silane. As used herein, the term "sulfur-containing ethylenically unsaturated silane" refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group

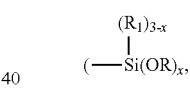

wherein R and $R_1$ each independently represent an organic group and x is 1, 2, or 3).

In certain embodiments, the sulfur-containing ethylenically unsaturated silane, which is suitable for use in the compositions of the present invention, itself comprises the reaction product of reactants comprising: (i) a mercaptosilane, and (ii) a polyene. As used herein, the term "mercaptosilane" refers to a molecular compound that comprises, within the molecule, (i) at least one mercapto (—SH) group, and (ii) at least one silane group (defined above). Suitable mercaptosilanes include, for example, those having a structure according to formula (IV):

HS—R—Si(R$_1$)$_m$(OR')$_{(3-m)}$        (IV)

wherein: (i) R is a divalent organic group; (ii) R' is hydrogen or an alkyl group; (iii) $R_1$ is hydrogen or an alkyl group; and (iv) m is an integer from 0 to 2.

Specific examples of mercaptosilanes, which are suitable for use in preparing the sulfur-containing ethylenically unsaturated silanes suitable for use in the present invention, include, without limitation, γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane mercaptomethyltriethoxysilane, and the like, including combinations thereof.

As used herein, the term "polyene" refers to a compound containing at least two carbon-carbon double bonds (C=C). In certain embodiments, the polyene used to prepare the sulfur-containing ethylenically unsaturated silanes suitable for use in the present invention comprises a triene, which refers to a compound containing three carbon-carbon double bonds, such as is the case with triallyl compounds, which are compounds comprising three allyl groups (C=C—C) and which include, for example, triallyl cyanurate (TAC) and triallyl isocyanurate (TAIC), including combinations thereof.

The Examples herein illustrate a suitable method for producing the sulfur-containing ethylenically unsaturated silanes suitable for use in the present invention. In certain embodiments, the polyene comprises a triene, such as one or more of the foregoing triallyl compounds, and the mercaptosilane and triene are reacted together in relative amounts such that the resulting reaction product theoretically comprises an average of at least two ethylenically unsaturated groups per molecule.

In addition, in certain embodiments, the compositions of the present invention further comprise a polyene in addition to the polyene used to prepare the sulfur-containing ethylenically unsaturated silane described above. Suitable polyenes include, without limitation, polyvinyl ethers and polyallyl compounds, such as any of those described above in connection with the preparation of the sulfur-containing ethylenically unsaturated silane, including the aforedescribed triallyl compounds. In some cases, however, such polyenes comprise a diene. As used herein, the term "diene" refers to a compound that has two carbon-carbon double bonds. Non-limiting exemplary dienes include pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_{(w)}$ less than 1000 g/mol). Non-limiting exemplary cyclic dienes include cyclopentadiene, vinylnorbornene, norbornadiene, ethylidene norbornene, divinylbenzene, dicyclopentadiene or higher ring containing diolefins with or without substituents at various ring positions.

In certain embodiments, however, the diene comprises a compound represented by Formula (V):

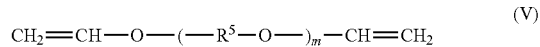
(V)

where $R^5$ in formula (V) is a $C_{2-6}$ n-alkylene group, a $C_{2-6}$ branched alkylene group, a $C_{6-8}$ cycloalkylene group, a $C_{6-10}$ alkylcycloalkylene group, or

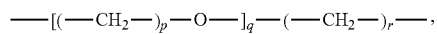, where p is an integer having a value ranging from 2 to 6, q is an integer having a value ranging from 1 to 5, and r is an integer having a value ranging from 2 to 10.

The materials of formula (V) are divinyl ethers. Suitable divinyl ethers include those compounds having at least one oxyalkylene group, such as from 1 to 4 oxyalkylene groups, i.e., those compounds in which m in formula (V) is an integer from 1 to 4. In some cases, m in formula (V) is an integer from 2 to 4. It is also possible to employ commercially available divinyl ether mixtures in the present invention. Such mixtures are characterized by a non-integral average value for the number of oxyalkylene units per molecule. Thus, m in formula (V) can also take on rational number values between 0 and 10.0, such as between 1.0 and 10.0, between 1.0 and 4.0, or between 2.0 and 4.0.

Suitable divinyl ether monomers for use in the present invention include, for example, divinyl ether, ethylene glycol divinyl ether (EG-DVE) (R in formula (V) is ethylene and m is 1), butanediol divinyl ether (BD-DVE) (R in formula (V) is butylene and m is 1), hexanediol divinyl ether (HD-DVE) (R in formula (V) is hexylene and m is 1), diethylene glycol divinyl ether (DEG-DVE) (R in formula (V) is ethylene and m is 2), triethylene glycol divinyl ether (R in formula (V) is ethylene and m is 3), tetraethylene glycol divinyl ether (R in formula (V) is ethylene and m is 4), cyclohexanedimethanol divinyl ether, polytetrahydrofuryl divinyl ether and mixtures thereof. In some cases, trivinyl ether monomers, such as trimethylolpropane trivinyl ether; tetrafunctional ether monomers, such as pentaerythritol tetravinyl ether; and mixtures of two or more such polyvinyl ether monomers can be used. The polyvinyl ether material can have one or more pendant groups selected from alkyl groups, hydroxyl groups, alkoxy groups and amine groups.

Useful divinyl ethers in which R in formula (V) is $C_{2-6}$ branched alkylene can be prepared by reacting a polyhydroxy compound with acetylene. Exemplary compounds of this type include compounds in which R in formula (V) is an alkyl-substituted methylene group such as —CH(CH$_3$)— (for example "PLURIOL®" blends such as PLURIOL®E-200 divinyl ether (BASF Corp. of Parsippany, N.J.), for which R in formula (V) is ethylene and m is 3.8) or an alkyl-substituted ethylene (for example —CH$_2$CH(CH$_3$)— such as "DPE" polymeric blends including DPE-2 and DPE-3 (International Specialty Products of Wayne, N.J.)).

Other useful divinyl ethers include compounds in which R in formula (V) is polytetrahydrofuryl (poly-THF) or polyoxyalkylene, such as those having an average of about 3 monomer units.

Two or more divinyl ether monomers of the formula (V) can be used if desired.

The Examples herein described suitable methods and conditions for making the compositions of the present invention.

Certain embodiments of the present invention are directed to products, such as aerospace sealants, comprising a polymer that is the reaction product of reactants comprising: (a) a thiol-terminated polymer, such as any of those described above; and (b) a sulfur-containing ethylenically unsaturated silane, such as is described above. Such polymers can be made under any desired condition suitable for causing reaction of the thiol groups of the thiol-terminated polymer with the ethylenically unsaturated groups of the sulfur-containing ethylenically unsaturated silane and, if present, any additional polyenes, such as, for example, any of the aforedescribed divinyl ethers. Such a thiol-ene reaction may be catalyzed by a free-radical catalyst, such as azo compounds and organic peroxides.

In some embodiments of the present invention, however, the thiol-ene reaction described above, which forms the polymers of the present invention, is effected by irradiating a composition of the present invention with actinic radiation. As used herein, "actinic radiation" encompasses electron beam (EB) radiation, ultraviolet (UV) radiation, and visible light. In many cases, the thiol-ene reaction is effected by irradiating the composition with UV light and, in such cases, the compositions of the present invention often further comprise a photoinitiator. Moreover, in many cases, such compositions further comprise a polyene in addition to the polyene used to prepare the sulfur-containing ethylenically unsaturated silane, such as one or more of the triallyl compounds and/or polyvinyl ethers described above. Moreover, in certain embodiments, such compositions are "one-pack" compositions, which refer to storage stable compositions in which all of the composition components are stored together in a single container. As a result, certain embodiments of the present invention are directed to such compositions. In other embodiments, the compositions are "two-pack" compositions in which the thiol-terminated polymer and the sulfur-containing ethylenically unsaturated silane are stored separately and then combined together at or near the time of use.

In some embodiments, such irradiation with ultraviolet light is in conjunction with the manufacture of a cured sealant on a substrate. As such, certain embodiments of the present invention are directed to products, such as cured sealants (including aerospace sealants) that comprise the polymers of the present invention, which are sometimes made in connection with a method of making a cured sealant on a substrate that comprises: (a) depositing an uncured sealant composition on a substrate; and (b) exposing the uncured sealant composition to actinic radiation to provide a cured sealant comprising a polymer of the present invention, wherein the uncured sealant composition comprises: (i) a thiol-terminated polymer, such as any of those described above; and (ii) a sulfur-containing ethylenically unsaturated silane as described above. In many cases, such compositions further comprise a photoinitiator and/or a polyene in addition to the polyene used to prepare the sulfur-containing ethylenically unsaturated silane, such as one or more of the triallyl compounds and/or polyvinyl ethers described above, as well as other components typically used in aerospace sealant applications, such as fillers and the like.

The compositions of the present invention will often contain an essentially stoichiometric equivalent amount of thiol groups to "ene" groups in order to obtain a cured sealant upon exposure of the composition to actinic radiation. As used herein, "essentially stoichiometric equivalent" means that the number of thiol groups and "ene" groups present in the compositions differ by no more than 10% from each other, in some cases, no more than 5% or, in some cases, no more than 1% or no more than 0.1%. In some cases, the number of thiol groups and "ene" groups present in the composition are equal. Moreover, as will be appreciated, the source of "ene" groups in the compositions of the present invention includes the sulfur-containing ethylenically unsaturated silane itself as well as any additional polyene included in the composition (in addition to polyene used to prepared the sulfur-containing ethylenically unsaturated silane). In certain embodiments, the sulfur-containing ethylenically unsaturated silane described above is present in an amount such that 0.1 to 30, such as 1 to 30, or, in some cases, 10 to 25 percent of the total number of ethylenically unsaturated groups present in the composition are part of an sulfur-containing ethylenically unsaturated silane molecule, based on the number of ethylenically unsaturated groups in the composition.

As indicated, in certain embodiments, particularly when the cured sealants of the present invention are to be formed by exposure of the previously described composition to UV radiation, the compositions also comprise a photoinitiator. As will be appreciated by those skilled in the art, a photoinitiator absorbs ultraviolet radiation and transforms it into a radical that initiates polymerization. Photoinitiators are classified in two major groups based upon a mode of action, either or both of which may be used in the compositions of the present invention. Cleavage-type photoinitiators include acetophenones, α-aminoalkylphenones, benzoin ethers, benzoyl oximes, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of photoinitiators that may be used in the curable compositions of the present invention include benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthixantone, a-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, bis(2,4,6-trimethylbenzoyl)phenyl phosphine oxide, 2,6-dichlorobenzoyldiphenylphosphine oxide, and 2,6-dimethoxybenzoyldiphenylphosphine oxide, bisacylphosphine oxides, e.g., bis(2,6-dimethyoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis (2,6-dichlorobenzoyl)-2,4,4-trimethylpentylphosphine oxide, and mixtures thereof.

In certain embodiments, the compositions of the present invention comprise 0.01 up to 15 percent by weight of photoinitiator or, in some embodiments, 0.01 up to 10 percent by weight, or, in yet other embodiments, 0.01 up to 5 percent by weight of photoinitiator based on the total weight of the composition.

Fillers useful in the certain embodiments of the compositions of the present invention include those commonly used in the art, including conventional inorganic fillers, such as fumed silica, calcium carbonate ($CaCO_3$), and carbon black, as well as lightweight fillers. Fillers that are substantially transparent to ultraviolet radiation, such as fumed silica, may be particularly useful in some embodiments. Suitable lightweight fillers include, for example, those described in U.S. Pat. No. 6,525,168 at col. 4, lines 23-55, the cited portion of which being incorporated herein by reference and those described in United States Patent Application Publication No. US 2010-0041839 A1 at [0016] to [0052], the cited portion of which being incorporated herein by reference.

In some embodiments, the compositions of the present invention include a photoactive filler. As used herein, the term "photoactive filler" refers to a filler that comprises a material that is photoexcitable upon exposure to, and absorption of, ultraviolet and/or visible radiation. A photoactive material is a material that, when exposed to light having higher energy than the energy gap between the conduction band and the valence band of the crystal, causes excitation of electrons in the valence band to produce a conduction electron thereby laving a hole behind on the particular valence band. Exemplary, but non-limiting, photoactive fillers suitable for use in certain composition described herein are metal oxides, such as, for example, zinc oxide, tin oxide, ferric oxide, dibismouth trioxide, tungsten trioxide, titanium dioxide (including the brookite, anatase, and/or rutile crystalline forms of titanium dioxide), and mixtures thereof.

In certain embodiments, the compositions include 5 to 60 weight percent of the filler or combination of fillers, such as 10 to 50 weight percent, based on the total weight of the composition, so long as the presence of such fillers in such amounts does not cause a significant detrimental affect the performance of the composition.

In addition to the foregoing ingredients, certain compositions of the invention can optionally include one or more of the following: colorants (including photoactive dyes), thixotropes, retardants, solvents and masking agents, among other components.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, peryleneand quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

Photoactive dyes, which provide reversible or permanent photoinduced color change effects, are also suitable for use in the compositions described herein. Suitable photoactive dyes are commercially available from Spectra Group Limited, Inc., Millbury, Ohio.

Thixotropes, for example silica, are often used in an amount from 0.1 to 5 weight percent, based on the total weight of the composition.

Retardants, such as stearic acid, likewise often are used in an amount from 0.1 to 5 weight percent, based on the total weight of the composition. Masking agents, such as pine fragrance or other scents, which are useful in covering any low level odor of the composition, are often present in an amount from 0.1 to 1 weight percent, based on the total weight of the composition.

In certain embodiments, the compositions of the present invention comprise a plasticizer which, in at least some cases, may allow the composition to include polymers which have a higher $T_g$ than would ordinarily be useful in an aerospace sealant. That is, use of a plasticizer may effectively reduce the $T_g$ of the composition, and thus increase the low-temperature flexibility of the cured composition beyond that which would be expected on the basis of the $T_g$ of the polymer alone. Plasticizers that are useful in certain embodiments of the compositions of the present invention include, for example, phthalate esters, chlorinated paraffins, and hydrogenated terphenyls. The plasticizer or combination of plasticizers often constitute 1 to 40 weight percent, such as 1 to 10 weight percent of the composition. In certain embodiments, depending on the nature and amount of the plasticizer(s) used in the composition, polymers of the invention which have $T_g$ values up to −50° C., such as up to −55° C., can be used.

In certain embodiments, the compositions of the present invention can further comprise one or more organic solvents, such as isopropyl alcohol, in an amount ranging from, for example, 0 to 15 percent by weight on a basis of total weight of the composition, such as less than 15 weight percent and, in some cases, less than 10 weight percent. In certain embodiments, however, the compositions of the present invention are substantially free or, in some cases, completely free, of any solvent, such as an organic solvent or an aqueous solvent, i.e., water. Stated differently, in certain embodiments, the compositions of the present invention are substantially 100% solids.

In certain embodiments, the polymer of the present invention is present in the cured sealant of the present invention in an amount of at least 30 weight percent, such as least 40 weight percent, or, in some cases, at least 45 weight percent, based on the total weight of sealant. In certain embodiments, the polymer of the present invention is present in the cured sealant of the present invention in an amount of no more than 99 weight percent, such as no more than 95 weight percent, or, in some cases, no more than 90 weight percent, based on the total weight of sealant.

In certain embodiments, the sealants of the present invention have a $T_g$ when cured not higher than −55° C., such as not higher than −60° C., or, in some cases, not higher than −65° C.

Ultraviolet radiation from any suitable source which emits ultraviolet light having a wavelength ranging from, for example, 180 to 400 nanometers, may be employed to initiate the thiol-ene reaction described above and thereby form the polymers and cured sealants of the present invention. Suitable sources of ultraviolet light are generally known and include, for example, mercury arcs, carbon arcs, low pressure mercury lamps, medium pressure mercury lamps, high pressure mercury lamps, swirl-flow plasma arcs and ultraviolet light emitting diodes. Certain embodiments of the compositions of the invention can exhibit an excellent degree of cure in air at relatively low energy exposure in ultraviolet light.

In fact, it has been discovered, surprisingly, that UV cure of the compositions of the present invention to depths of up to 2 inches or more can be achieved in some cases. This means that cured sealants having a thickness of 2 inches or more, and having desirable sealant properties described herein, can be achieved by exposure of the compositions described herein to actinic radiation, such as ultraviolet radiation, in air at relatively low energy exposure.

As indicated, certain embodiments of the present invention are directed to compositions, such as sealant, coating, and/or electrical potting compositions that include one or more of the previously described polymers. As used herein, the term "sealant composition" refers to a composition that is capable of producing a film that has the ability to resist atmospheric conditions, such as moisture and temperature and at least partially block the transmission of materials, such as water, fuel, and other liquid and gasses. In certain embodiments, the sealant compositions of the present invention are useful, e.g., as aerospace sealants and linings for fuel tanks. In certain embodiments, the cured sealants comprise a polymer as described above in combination with other components, such as the fillers and other additives described above.

The compositions of the present invention can be deposited on any of a variety of substrates. Common substrates can include titanium, stainless steel, aluminum, anodized, primed, organic coated and chromate coated forms thereof, epoxy, urethane, graphite, fiberglass composite, KEVLAR®, acrylics and polycarbonates.

The compositions of the present invention can be deposited on the surface of a substrate or over an underlayer, such as a primer layer or a previously applied sealant.

In certain embodiments, the sealants of the present invention are fuel-resistant. As used herein, the term "fuel resistant" means that a product, such as a sealant, has a percent volume swell of not greater than 40%, in some cases not greater than 25%, in some cases not greater than 20%, in yet other cases not more than 10%, after immersion for one week at 140° F. (60° C.) and ambient pressure in jet reference fluid (JRF) Type I according to methods similar to those described in ASTM D792 or AMS 3269, incorporated herein by reference. Jet reference fluid JRF Type I, as employed herein for determination of fuel resistance, has the following composition (see AMS 2629, issued Jul. 1, 1989), §3.1.1 et seq., available from SAE (Society of Automotive Engineers, Warrendale, Pa.) (that is incorporated herein by reference): herein by reference):

| | |
|---|---|
| Toluene | 28 ± 1% by volume |
| Cyclohexane (technical) | 34 ± 1% by volume |
| Isooctane | 38 ± 1% by volume |
| Tertiary dibutyl disulfide (doctor sweet) | 1 ± 0.005% by volume |

In certain embodiments, products of the present invention, such as a sealant, have an elongation of at least 100% and a tensile strength of at least 250 psi when measured in accordance with the procedure described in AMS 3279, §3.3.17.1, test procedure AS5127/1, §7.7.

In certain embodiments, cured product of the present invention, such as sealants, having a tear strength of at least 25 pounds per linear inch (pli) or more when measured according to ASTM D624 Die C.

As should be apparent from the foregoing description, the present invention is also directed to methods for sealing an aperture utilizing a composition of the present invention. These methods comprise (a) applying a composition of the present invention to a surface to seal the aperture; and (b) curing the composition by, for example, exposing the composition to actinic radiation. As will also be appreciated, the present invention is also directed to aerospace vehicles comprising at least a polymer of the present invention.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Polythioether Polymer Synthesis

A resin was prepared in the manner described in Example 1 of U.S. Pat. No. 6,232,401. The polymer (theoretical functionality: 2.2) had a mercaptan equivalent weight of 1640 and a viscosity of 70 poise.

Example 2

Polythioether Polymer Synthesis

Triallylcyanurate (36.67 g, 0.15 mole) and dimercaptodioxaoctane (DMDO) (449.47 g, 2.47 moles) were charged in a 1-liter 4-neck round-bottom flask. The flask was equipped with a stirrer, gas-passing adapter and thermometer. Stirring was started. The flask was flushed with dry nitrogen, a solution of potassium hydroxide (0.012 g; concentration: 50%) was added and the reaction mixture was heated to 76° C. A solution of radical initiator Vazo-67 (0.32 g) in diethylene glycol divinyl ether (316.44 g, 2.00 moles) was introduced in the reaction mixture over a period of 2 hours during which a temperature of 66-76° C. was maintained. Following the completion of the addition of the divinyl ether, temperature of the reaction mixture increased to 84° C. The reaction mixture was cooled to 74° C. and nine portions of Vazo-67 (~0.151 g each) were added at an interval of 1 hour while the temperature was maintained at 74-77° C. The reaction mixture was heated at 100° C. for 2 hours, cooled to 80° C., and evacuated at 68-80° C./5-7 mmHg for 1.75 hr. The resulting polymer (theoretical functionality: 2.8) had a mercaptan equivalent weight of 1566, and a viscosity of 140 poise.

Example 3

Synthesis of Sulfur-Containing Ethylenically Unsaturated Silane

In a 1-liter 4-necked round bottom flask fitted with stirrer, nitrogen inlet, and thermal probe, TAC (121.00 g, 0.49 mole) and y-mercaptopropyltrimethoxysilane (Silquest® 189, 95.25 g, 0.49 mole) were added at room temperature (25° C., 77° F.). Upon addition there was a small exotherm to 40° C. (104° F.). The reaction was slowly heated to 70° C. (158° F.). Once the temperature reached 70° C. (158° F.), Vazo-67 (0.026 g, 0.012% by weight) was added and the reaction was monitored by mercaptan titration (mercaptan titration indicating a mercaptan equivalent of greater 50,000 marked the end of the reaction). At a mercaptan equivalent of 6100, Vazo 67 (0.042 g, 0.019% by weight) was added and the reaction was allowed to stir at 70° C. (158° F.) while being monitored. At mercaptan equivalent of 16,335, Vazo-67 (0.036 g, 1.7%) was added. At mercaptan equivalent of 39,942 Vazo-67 (0.016 g, 0.007%) was added. At a mercaptan equivalent of 61,425 the reaction was considered complete and stopped.

Example 4

Curing Polythioether Polymer with DVE/Adduct Blend

The curing reaction was performed in a 300 g plastic container with lid. The polymer of Example 1 (120 g, 0.07 equivalent mole), DVE (4.28 g, 0.05 equivalent mole), and the adduct described in Example 3 (4.03 g, 0.02 equivalent mole) were added to the 300 g container. The container was placed in a speed mixer (DAC 600 FVZ) and mixed for 30 seconds for 2300 rpm. The container was opened and Irgacure® 2022 (A Bis Acyl Phosphine/α-Hydroxyketone photoinitiator from BASF, 0.641 g, 0.5% by weight) was added, and the container was placed in the speed mixer again and mixed for 1 minute at 2300 rpm. The polymer was poured over a circular (5 inches in diameter) metal lid (pre-treated with Valspar Mold Release 225), and placed under UV light for 15 seconds, after which time the polymer appeared to have cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the polymer composition. Up to 2 inches of cured sealant was obtained. The polymer was left at ambient temperature for 4 days to insure that it had fully cured. The hardness of the polymer, measured by a Durometer was 31 Shore A. The polymer was cut into seven, ½ inch dog bones with a tensile strength gauge. Dry tensile and elongation were measured for three of the specimens. The results (an average of the three) are as follows: 282 psi (tensile) and 421% (elongation). Two of the ½ inch dog bones were placed in a glass jar, with a lid, and covered with jet reference fuel (JRF Type I) and placed in a 140° F. (60° C.) water bath for 7 days. The results (an average of the two) were as follows: 141 psi (tensile), 78% (elongation). Two of the ½ inch dog bones were placed in a glass jar, with lid, covered with tap water and placed in a 200° F. (93° C.) oven for 2 days. The results (an average of two) were as follows: 36 Shore A (hardness), 134 psi (tensile strength), and 50% (elongation). Tensile strength and elongation data were obtained according to ASTM D 412 and hardness data was obtained according to ASTM D 2240.

A portion of the polymer composition was spread onto a 3"×6" AMS-C-27725 coated aluminum panel and cured according the curing method described previously. An approximately ⅛" thick cured polymer film was obtained. The film was further cut into two one-inch strips and the strips were pulled back at 180 degree angles with hands. The percent of adhesion to the substrate was recorded and the results were shown in Table 3.

Example 5

Curing Polythioether Polymer with DVE/Adduct Blend

The curing reaction was performed in a 300 g plastic container with lid. The polymer described in Example 1 (120.00 g, 0.073 equivalent mole), DEG-DVE (5.20 g, 0.066 equivalent mole), and the adduct described in Example 3 (1.60 g, 0.007 equivalent mole) were added to the 300 g container. The container was placed in a speed mixer (DAC 600 FVZ) and mixed for 30 seconds for 2300 rpm. The container was opened and Irgacure® 2022 (0.63 g, 0.5% by weight) was added, and the container was placed in the speed mixer again and mixed for 1 minute at 2300 rpm. The polymer was poured over a circular (5 inches in diameter) metal lid (pre-treated with Valspar Mold Release 225), and placed under UV light for 15 seconds after which time the polymer appeared to have cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the polymer composition. Up to 2 inches of cured sealant was obtained. The polymer was left at ambient temperature for 4 days to insure that it had fully cured. The hardness of the polymer, measured by a Durometer was 30 Shore A. The polymer was cut into seven, ½ inch dog bones with a tensile gage. Dry tensile and elongation were measured for three of the specimens. The results (an average of the three) are as follows: 251 psi (tensile strength) and 559% (elongation). Two of the ½ inch dog bones were placed in a glass jar, with a lid, and covered with jet reference fuel (JRF Type I) and placed in a 140° F. (60° C.) water bath for 7 days. The results (an average of the two) are as follows: 202 psi (tensile), 351% (elongation). Two of the ½ inch dog bones were placed in a glass jar, with lid, covered with tap water and placed in a 200° F. (93° C.) oven for 2 days. The results (an average of two) are as follows: 25 Shore A (hardness), 204 psi (tensile strength), and 274% (elongation). Tensile and elongation data were obtained according to ASTM D 412 and hardness data was obtained according to ASTM D 2240.

A portion of the polymer composition was spread onto a 3"×6" MIL-C-27725 coated aluminum panel and cured according the method described previously. An approximately ⅛" thick cured polymer film was obtained. The film was further cut into two one-inch strips and the strips were pulled back at 180 degree angles with hands. The percent of adhesion to the substrate was recorded and the results were shown in Table 3.

Example 6

Sealant Composition with Adduct

A sealant composition was prepared by mixing polymer described in Example 1 and adduct prepared according to Example 3 with triethylene glycol divinyl ether (TEG-DVE) and other ingredients described in Table 1.

TABLE 1

| Component | Charge Weight, grams |
| --- | --- |
| Polymer from Example 1 | 300.00 |
| TEG-DVE | 12.84 |
| Adduct from Example 3 | 4.02 |
| Calcium carbonate | 9.39 |
| IRGACURE © 2022 | 1.62 |

All ingredients described in Table 1 were intimately mixed. A portion of the sealant composition was poured into a 2" diameter paper cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the sealant composition. Up to 1.5 inches of cured sealant was obtained.

A portion of the polymer composition was spread onto a 3"×6" AMS-C-27725 coated aluminum panel and cured according the method described previously. An approximately ⅛" thick cured polymer film was obtained. The film was further cut into two one-inch strips and the strips were pulled back at 180 degree angles with hands. The percent of adhesion to the substrate was recorded and the results were shown in Table 3.

Comparative Example 7

Curing Polythioether Polymer without Adduct

The curing reaction was performed in a 100 g plastic container with lid. The polymer described in Example 1 (50.00 g, 0.03 equivalent mole) and diethylene glycol divinyl ether (DEG-DVE) (2.40 g, 0.03 equivalent mole) were added to the 100 g container. The container was placed in a high speed mixer (DAC 600 FVZ) and mixed for 1 minute at 2300 rpm. The container was opened and Irgacure® 2022 (0.540 g, 1% by weight) was added, and the container was closed and placed in the speed mixer again and mixed for 30 seconds at 2300 rpm. The polymer was poured over a circular (5 inches in diameter) metal lid (pre-treated with Valspar Mold Release 225), and placed under UV light for 15 seconds after which time the polymer had completely cured. The curing was achieved using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the polymer composition. Up to 2 inches of cured polymer was obtained. The hardness of the polymer was measured with a Durometer to be 20 Shore A. The polymer was cut into six, ½ inch dog bones with a tensile strength gauge, and 3 of the specimens were used to measure dry (no water or fuel immersion) tensile and elongation, via Instron. The results (an average of the three) were as follows: 250 psi (tensile strength), and 1011% (elongation). One of the ½ inch dog bones was cut in half and placed in 20 mL vial with lid and placed in a 200° F. (93° C.) oven. The sample was kept at 200° F. (93° C.) for 2 days after which time the hardness was checked to be 10 Shore A.

A portion of the polymer composition was spread onto a 3"×6" AMS-C-27725 coated aluminum panel and cured according the method described previously. An approximately ⅛" thick cured polymer film was obtained. The film was further cut into two one-inch strips and the strips were pulled back at 180 degree angles with hands. The percent of adhesion to the substrate was recorded and the results were shown in Table 3.

Comparative Example 8

Sealant Composition without Adduct

A sealant was prepared by mixing polymer described in Example 1 and polymer described in Example 2 with diethylene glycol divinyl ether (DEG-DVE) and other ingredients described in Table 2.

TABLE 2

| Component | Weight, grams |
| --- | --- |
| Polymer Example 1 | 240.00 |
| Polymer Example 2 | 60.00 |
| DEG-DVE | 14.28 |
| Silquest A-189[1] | 0.77 |
| Water | 0.16 |
| Calcium Carbonate | 9.33 |
| Irgacure 2022 | 1.62 |

[1]Silquest A-189 is mercapatopropyltrimethoxy silane, available from Momentive Performance Matrerials, Inc.

All ingredients described in Table 2 were intimately mixed. A portion of the sealant composition was poured into a 2" diameter paper cup and cured for 15 seconds using a Super Six curing unit, available from Fusion Systems Inc. The curing unit was equipped with a 300 W H-bulb, which produced UV wavelengths ranging from 200 nm to 450 nm. A total dosage of 3.103 J/cm$^2$ UV energy, measured by a UV power puck, available from EIT, Inc of Sterling, Va., was applied to the sealant composition. Up to 1.5 inches of cured sealant was obtained.

A portion of the polymer composition was spread onto a 3"×6" AMS-C-27725 coated aluminum panel and cured according the method described previously. An approximately ⅛" thick cured polymer film was obtained. The film was further cut into two one-inch strips and the strips were pulled back at 180 degree angles with hands. The percent of adhesion to the substrate was recorded and the results were shown in Table 3.

TABLE 3

Adhesion of Various Polymer Compositions to AMS-C-27725 Coated Aluminum

| Composition | Adhesion |
| --- | --- |
| Example 4 | 100% Cohesive |
| Example 5 | 100% Cohesive |
| Example 6 | >95% Cohesive |
| Comparative Example 7 | 0% Cohesive |
| Comparative Example 8 | <50% Cohesive |

Whereas particular embodiments of this invention have been described above for purposes of illustration, it will be evident to those skilled in the art that numerous variations of the details of the present invention may be made without departing from the invention as defined in the appended claims.

What is claimed is:

1. A composition comprising:
   (a) a thiol-terminated polymer;
   (b) a sulfur-containing ethylenically unsaturated silane; and
   (c) a polyene comprising a polyvinyl ether wherein the polyvinyl ether has the structure of Formula (V):

$$CH_2=CH-O-(-R^5-O-)_m-CH=CH_2$$

wherein,
   R5 is selected from a $C_{2-6}$ n-alkylene group, a $C_{2-6}$ branched alkylene group, a $C_{6-8}$ cycloalkylene group, a $C_{6-10}$ alkylcycloalkylene group, or

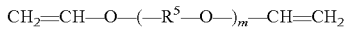

wherein,
   p is an integer from 2 to 6; q is an integer from 1 to 5; and r is an integer from 2 to 10,
   and wherein the polyvinyl ether does not include triethyleneglycol divinyl ether or cyclohexanedimethanol divinyl ether.

2. The composition of claim 1, wherein the composition is substantially free of any component comprising ester linkages.

3. The composition of claim 1, wherein the thiol terminated polymer comprises sulfur-containing linkages in the polymeric backbone.

4. The composition of claim 3, wherein the thiol terminated polymer comprises a polythioether.

5. The composition of claim 4, wherein the thiol-terminated polymer comprises a structure having the formula:

$$-R^1-[-S-(CH_2)_2-O-[-R^2-O-]_m-(CH_2)_2-S-R^1-]_n-;$$

wherein
   (1) each $R^1$ independently denotes a $C_{2-10}$ n-alkylene group, a $C_{2-6}$ branched alkylene group, a $C_{6-8}$ cycloalkylene group, a $C_{6-10}$ alkylcycloalkylene group,

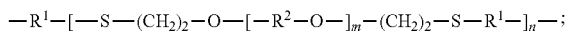

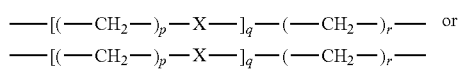

in which at least one —$CH_2$—unit is substituted with a methyl group, wherein:
   (i) each X is independently selected from O, S, and —$NR^6$—, wherein $R^6$ is hydrogen or methyl;
   (ii) p is an integer having a value ranging from 2 to 6;
   (iii) q is an integer having a value ranging from 0 to 5; and (iv) r is an integer having a value ranging from 2 to 10;
   (2) each $R^2$ independently denotes a $C_{2-10}$ n-alkylene group, a $C_{2-6}$ branched alkylene group, a $C_{6-8}$ cycloalkylene group, a $C_{6-10}$ alkylcycloalkylene group, or

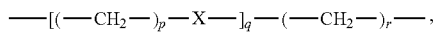

wherein:
   (i) each X is independently selected from O, S, and —$NR^6$—, wherein $R^6$ is hydrogen or methyl;
   (ii) p is an integer having a value ranging from 2 to 6;
   (iii) q is an integer having a value ranging from 0 to 5; and
   (iv) r is an integer having a value ranging from 2 to 10;
   (3) m is a rational number from 0 to 10; and
   (4) n is an integer having a value ranging from 1 to 60.

6. The composition of claim 1, wherein the sulfur-containing ethylenically unsaturated silane comprises an average of at least two ethylenically unsaturated groups per molecule.

7. The composition of claim 1, wherein the sulfur-containing ethylenically unsaturated silane is the reaction product of reactants comprising:
   (i) a mercaptosilane; and
   (ii) a polyene.

8. The composition of claim 7, wherein the polyene (ii) comprises a triallyl compound comprising a cyanurate.

9. The composition of claim 1, further comprising a photoinitiator.

10. The composition of claim 1, wherein the sulfur-containing ethylenically unsaturated silane is present in an amount such that 0.1 to 30 percent of the ethylenically unsaturated groups present in the composition are on the sulfur-containing ethylenically unsaturated silane, where percent is based on the total number of ethylenically unsaturated groups in the composition.

11. A product comprising the reaction product of reactants comprising:
    (a) a thiol-terminated polymer; and
    (b) a sulfur-containing ethylenically unsaturated silane; and
    (c) a polyene comprising a polyvinyl ether wherein the polyvinyl ether has the structure of Formula (V):

$$CH_2=CH-O-(-R^5-O-)_m-CH=CH_2$$

wherein,
    R5 is selected from a $C_{2-6}$ n-alkylene group, a $C_{2-6}$ branched alkylene group, a $C_{6-8}$ cycloalkylene group, a $C_{6-10}$ alkylcycloalkylene group, or

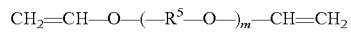

wherein,
    p is an integer from 2 to 6; q is an integer from 1 to 5; and r is an integer from 2 to 10,
    and wherein the polyvinyl ether does not include triethyleneglycol divinyl ether or cyclohexanedimethanol divinyl ether.

12. The product of claim 11, wherein the thiol terminated polymer comprises a polythioether polymer comprising a structure having the formula:

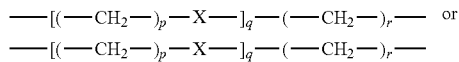

wherein
(1) each $R^1$ independently denotes a $C_{2\text{-}10}$ n-alkylene group, a $C_{2\text{-}6}$ branched alkylene group, a $C_{6\text{-}8}$ cycloalkylene group, a $C_{6\text{-}10}$ alkylcycloalkylene group,

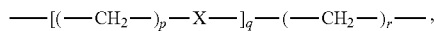

in which at least one —CH$_2$—unit is substituted with a methyl group, wherein:
(i) each X is independently selected from O, S, and —NR$^6$—, wherein R$^6$ is hydrogen or methyl;
(ii) p is an integer having a value ranging from 2 to 6;
(iii) q is an integer having a value ranging from 0 to 5; and (iv) r is an integer having a value ranging from 2 to 10;
(2) each $R^2$ independently denotes a $C_{2\text{-}10}$ n-alkylene group, a $C_{2\text{-}6}$ branched alkylene group, a $C_{6\text{-}8}$ cycloalkylene group, a $C_{6\text{-}10}$ alkylcycloalkylene group, or

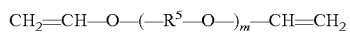

wherein:
(i) each X is independently selected from O, S, and —NR$^6$—, wherein R$^6$ is hydrogen or methyl;
(ii) p is an integer having a value ranging from 2 to 6;
(iii) q is an integer having a value ranging from 0 to 5; and
(iv) r is an integer having a value ranging from 2 to 10;
(3) m is a rational number from 0 to 10; and
(4) n is an integer having a value ranging from 1 to 60.

13. A method of making a cured sealant on a substrate comprising:
(a) depositing an uncured sealant composition on a substrate, wherein the uncured sealant composition comprises:
(i) a thiol-terminated polymer; and
(ii) a sulfur-containing ethylenically unsaturated silane;
(iii) a polyene comprising a polyvinyl ether; and
(b) exposing the uncured sealant composition to actinic radiation wherein the polyvinyl ether has the structure of Formula (V):

CH$_2$=CH—O—(—R$^5$—O—)$_m$—CH=CH$_2$ wherein,
R5 is selected from a $C_{2\text{-}6}$ n-alkylene group, a $C_{2\text{-}6}$ branched alkylene group, a $C_{6\text{-}8}$ cycloalkylene group, a $C_{6\text{-}10}$ alkylcycloalkylene group, or

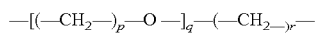

wherein,
p is an integer from 2 to 6; q is an integer from 1 to 5; and r is an integer from 2 to 10,
and wherein the polyvinyl ether does not include triethyleneglycol divinyl ether or cyclohexanedimethanol divinyl ether.

14. The method of claim 13, wherein the thiol terminated polymer comprises a polythioether.

15. The method of claim 14, wherein the thiol-terminated polymer comprises a structure having the formula:

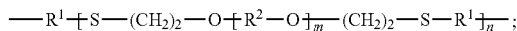

wherein
(1) each $R^1$ independently denotes a $C_{2\text{-}10}$ n-alkylene group, a $C_{2\text{-}6}$ branched alkylene group, a $C_{6\text{-}8}$ cycloalkylene group, a $C_{6\text{-}10}$ alkylcycloalkylene group,

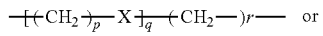

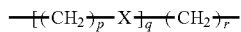

in which at least one —CH$_2$—unit is substituted with a methyl group, wherein:
(i) each X is independently selected from O, S, and —NR$^6$—, wherein R$^6$ is hydrogen or methyl;
(ii) p is an integer having a value ranging from 2 to 6;
(iii) q is an integer having a value ranging from 0 to 5; and (iv) r is an integer having a value ranging from 2 to 10;
(2) each $R^2$ independently denotes a $C_{2\text{-}10}$ n-alkylene group, a $C_{2\text{-}6}$ branched alkylene group, a $C_{6\text{-}8}$ cycloalkylene group, a $C_{6\text{-}10}$ alkylcycloalkylene group, or

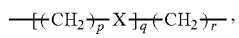

wherein:
(i) each X is independently selected from O, S, and —NR$^6$—, wherein R$^6$ is hydrogen or methyl;
(ii) p is an integer having a value ranging from 2 to 6;
(iii) q is an integer having a value ranging from 0 to 5; and
(iv) r is an integer having a value ranging from 2 to 10;
(3) m is a rational number from 0 to 10; and
(4) n is an integer having a value ranging from 1 to 60.

16. The method of claim 13, wherein the sulfur-containing ethylenically unsaturated silane comprises an average of at least two ethylenically unsaturated groups per molecule.

17. The method of claim 13, wherein the uncured sealant composition further comprises a photoinitiator and the actinic radiation comprises ultraviolet radiation.

18. The method of claim 13, wherein the sulfur-containing ethylenically unsaturated silane is present in an amount such that 0.1 to 30 percent of the ethylenically unsaturated groups present in the composition are on the sulfur-containing ethylenically unsaturated silane, where percent is based on the total number of ethylenically unsaturated groups in the composition.

19. The composition of claim 1, wherein the ethylenically unsaturated silane comprises:
(a) at least one sulfur atom;
(b) at least one ethylenically unsaturated carbon-carbon bond; and
(c) at least one silane group having the structure:

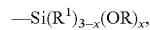

wherein R and $R^1$ each independently represent and organic group and x is 1, 2 or 3.

20. The composition of claim 19, which comprises the reaction product of reactants comprising:

(a) a mercaptosilane; and
(b) a polyene.

21. The composition of claim 20, wherein the polyene comprises a triene.

22. The composition of claim 21, wherein the triene comprises a triallyl compound.

23. The composition of claim 22, wherein the triallyl compound comprises triallyl cyanurate triallyl isocyanurate, or a combination thereof.

24. The composition of claim 21, wherein the reaction product comprises at least two ethylenically unsaturated carbon-carbon bonds.

25. A method of using the compound of claim 19, comprising combining the compound with a thiol-terminated polymer.

26. The method of claim 25, wherein the thiol terminated polymer comprises sulfur-containing linkages in the polymeric backbone.

27. The method of claim 26, wherein the thiol terminated polymer comprises a polythioether.

28. The method of claim 27, wherein the thiol-terminated polymer comprises a structure having the formula:

$$—R^1—[S—(CH_2)_2—O—[R^2—O]_m—(CH_2)_2—S—R^1]_n—;$$

wherein
(1) each $R^1$ independently denotes a $C_{2-10}$ n-alkylene group, a $C_{2-6}$ branched alkylene group, a $C_{6-8}$ cycloalkylene group, a $C_{6-10}$ alkylcycloalkylene group,

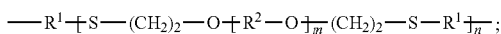

in which at least one —CH$_2$—unit is substituted with a methyl group, wherein:
(i) each X is independently selected from O, S, and —NR$^6$—, wherein R$^6$ is hydrogen or methyl;
(ii) p is an integer having a value ranging from 2 to 6;
(iii) q is an integer having a value ranging from 0 to 5; and (iv) r is an integer having a value ranging from 2 to 10;

(2) each $R^2$ independently denotes a $C_{2-10}$ n-alkylene group, a $C_{2-6}$ branched alkylene group, a $C_{6-8}$ cycloalkylene group, a $C_{6-10}$ alkylcycloalkylene group, or

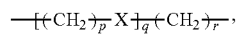

wherein:
(i) each X is independently selected from O, S, and —NR$^6$—, wherein R$^6$ is hydrogen or methyl;
(ii) p is an integer having a value ranging from 2 to 6;
(iii) q is an integer having a value ranging from 0 to 5; and
(iv) r is an integer having a value ranging from 2 to 10;
(3) m is a rational number from 0 to 10; and
(4) n is an integer having a value ranging from 1 to 60.

29. The composition of claim 1, wherein the polyvinyl ether is selected from divinyl ether, ethylene glycol divinyl ether, butanediol divinyl ether, hexanediol divinyl ether, diethylene glycol divinyl ether, tetraethylene glycol divinyl ethers, cyclohexane dimethanol divinyl ether, polytetrahydrofuryl divinyl ether, trimethylolpropane trivinyl ether, pentaerythritol tetravinyl ether, and combinations of any of the foregoing.

30. The composition of claim 1, wherein the polyvinyl ether is selected from divinyl ether, diethylene glycol divinyl ether, and combinations thereof.

31. The composition of claim 1,
wherein the composition comprises a stoichiometric equivalent amouh of thiol groups to terminal ethylenically unsaturated groups within 10%.

32. The composition of claim 13, wherein the polyvinyl ether is selected from divinyl ether, ethylene glycol divinyl ether, butanediol divinyl ether, hexanediol divinyl ether, diethylene glycol divinyl ether, tetraethylene glycol divinyl ethers, cyclohexane dimethanol divinyl ether, polytetrahydrofuryl divinyl ether, trimethylolpropane trivinyl ether, pentaerythritol tetravinyl ether, and combinations of any of the foregoing.

33. The composition of claim 13, wherein the polyvinyl ether is selected from divinyl ether, diethylene glycol divinyl ether, and combinations thereof.

34. The composition of claim 13,
wherein the composition comprises a stoichiometric equivalent amount of thiol groups to terminal ethylenically unsaturated groups within 10%.

* * * * *